(12) United States Patent
Morton

(10) Patent No.: US 8,735,833 B2
(45) Date of Patent: May 27, 2014

(54) PHOTOMULTIPLIER AND DETECTION SYSTEMS

(71) Applicant: Rapiscan System, Inc., Torrance, CA (US)

(72) Inventor: Edward James Morton, Guildford (GB)

(73) Assignee: Rapiscan Systems, Inc, Torrance, CA (US)

( * ) Notice: Subject to any disclaimer, the term of this patent is extended or adjusted under 35 U.S.C. 154(b) by 0 days.

(21) Appl. No.: 13/775,253

(22) Filed: Feb. 25, 2013

(65) Prior Publication Data

US 2013/0299703 A1   Nov. 14, 2013

Related U.S. Application Data

(63) Continuation of application No. 12/997,251, filed as application No. PCT/GB2009/001444 on Jun. 11, 2009, now Pat. No. 8,389,942.

(30) Foreign Application Priority Data

Jun. 11, 2008 (GB) .................................. 0810638.7

(51) Int. Cl.
   *G01T 1/161* (2006.01)
(52) U.S. Cl.
   USPC .................................................... 250/363.02
(58) Field of Classification Search
   USPC .......................................... 250/363.01–363.1
   See application file for complete search history.

(56) References Cited

U.S. PATENT DOCUMENTS

| | | | |
|---|---|---|---|
| 2,831,123 | A | 4/1958 | Daly |
| 2,971,433 | A | 2/1961 | Akin |
| 3,676,783 | A | 7/1972 | Kinbara et al. |
| 3,766,387 | A | 10/1973 | Heffan et al. |
| 3,767,850 | A | 10/1973 | McMillian et al. |
| 3,770,955 | A | 11/1973 | Tomita et al. |

(Continued)

FOREIGN PATENT DOCUMENTS

| | | |
|---|---|---|
| EP | 0077018 | 4/1983 |
| EP | 176314 | 4/1986 |

(Continued)

OTHER PUBLICATIONS

Mobile X-Ray Inspection Systems, Internet Citation, Feb. 12, 2007, pp. 1-2, URL:http://web.archive.org/web/20070212000928/http://www.bombdetection.com/cat—details.php?catid=20.

(Continued)

*Primary Examiner* — Kiho Kim
(74) *Attorney, Agent, or Firm* — Novel IP

(57) ABSTRACT

The invention provides a switchable photomultiplier switchable between a detecting state and a non-detecting state including a cathode upon which incident radiation is arranged to impinge. The photomultiplier also includes a series of dynodes arranged to amplify a current created at the cathode upon detection of photoradiation. The invention also provides a detection system arranged to detect radiation-emitting material in an object. The system includes a detector switchable between a detecting state in which the detector is arranged to detect radiation and a non-detecting state in which the detector is arranged to not detect radiation. The system further includes a controller arranged to control switching of the detector between the states such that the detector is switched to the non-detecting state while an external radiation source is irradiating the object.

19 Claims, 6 Drawing Sheets

(56) References Cited

U.S. PATENT DOCUMENTS

| | | | |
|---|---|---|---|
| 3,784,837 A | 1/1974 | Holmstrom |
| RE28,544 E | 9/1975 | Stein et al. |
| 3,904,923 A | 9/1975 | Schwartz |
| 4,047,035 A | 9/1977 | Dennhoven et al. |
| 4,139,771 A | 2/1979 | Dennhoven et al. |
| 4,210,811 A | 7/1980 | Dennhoven et al. |
| 4,216,499 A | 8/1980 | Kunze et al. |
| 4,366,382 A | 12/1982 | Kotowski |
| 4,430,568 A | 2/1984 | Yoshida et al. |
| 4,563,707 A | 1/1986 | Kishida |
| 4,566,113 A | 1/1986 | Donges et al. |
| 4,599,740 A | 7/1986 | Cable |
| 4,626,688 A | 12/1986 | Barnes |
| 4,641,330 A | 2/1987 | Herwig et al. |
| 4,709,382 A | 11/1987 | Sones |
| 4,736,401 A | 4/1988 | Donges et al. |
| 4,788,704 A | 11/1988 | Donges et al. |
| 4,817,123 A | 3/1989 | Sones et al. |
| 4,825,454 A | 4/1989 | Annis et al. |
| 4,853,595 A | 8/1989 | Alfano et al. |
| 4,872,188 A | 10/1989 | Lauro et al. |
| 4,884,289 A | 11/1989 | Glockmann et al. |
| 4,979,202 A | 12/1990 | Siczek et al. |
| 4,991,189 A | 2/1991 | Boomgaarden et al. |
| 5,006,299 A | 4/1991 | Gozani et al. |
| 5,022,062 A | 6/1991 | Annis |
| 5,065,418 A | 11/1991 | Bermbach et al. |
| 5,076,993 A | 12/1991 | Sawa et al. |
| 5,091,924 A | 2/1992 | Bermbach et al. |
| 5,098,640 A | 3/1992 | Gozani et al. |
| 5,114,662 A | 5/1992 | Gozani et al. |
| 5,179,581 A | 1/1993 | Annis |
| 5,181,234 A | 1/1993 | Smith |
| 5,182,764 A | 1/1993 | Peschmann et al. |
| 5,221,843 A | 6/1993 | Alvarez |
| 5,224,144 A | 6/1993 | Annis |
| 5,237,598 A | 8/1993 | Albert |
| 5,247,561 A | 9/1993 | Kotowski |
| 5,253,283 A | 10/1993 | Annis et al. |
| 5,313,511 A | 5/1994 | Annis et al. |
| 5,367,552 A | 11/1994 | Peschmann |
| 5,379,334 A | 1/1995 | Zimmer et al. |
| 5,493,596 A | 2/1996 | Annis |
| 5,548,123 A | 8/1996 | Perez-Mendez et al. |
| 5,606,167 A | 2/1997 | Miller |
| 5,608,214 A * | 3/1997 | Baron et al. ............. 250/262 |
| 5,638,420 A | 6/1997 | Armistead |
| 5,642,393 A | 6/1997 | Krug et al. |
| 5,642,394 A | 6/1997 | Rothschild |
| 5,666,393 A | 9/1997 | Annis |
| 5,687,210 A | 11/1997 | Maitrejean et al. |
| 5,692,028 A | 11/1997 | Geus et al. |
| 5,751,837 A | 5/1998 | Watanabe et al. |
| 5,764,683 A | 6/1998 | Swift et al. |
| 5,768,334 A | 6/1998 | Maitrejean et al. |
| 5,787,145 A | 7/1998 | Geus |
| 5,805,660 A | 9/1998 | Perion et al. |
| 5,838,759 A | 11/1998 | Armistead |
| 5,903,623 A | 5/1999 | Swift et al. |
| 5,910,973 A | 6/1999 | Grodzins |
| 5,930,326 A | 7/1999 | Rothschild et al. |
| 5,940,468 A | 8/1999 | Huang et al. |
| 5,974,111 A | 10/1999 | Krug et al. |
| 6,031,890 A | 2/2000 | Bermbach et al. |
| 6,058,158 A | 5/2000 | Eiler |
| 6,067,344 A | 5/2000 | Grodzins et al. |
| 6,081,580 A | 6/2000 | Grodzins et al. |
| 6,094,472 A | 7/2000 | Smith |
| 6,151,381 A | 11/2000 | Grodzins et al. |
| 6,188,747 B1 | 2/2001 | Geus et al. |
| 6,192,101 B1 | 2/2001 | Grodzins |
| 6,192,104 B1 | 2/2001 | Adams |
| 6,195,413 B1 | 2/2001 | Geus et al. |
| 6,198,795 B1 | 3/2001 | Naumann et al. |
| 6,218,943 B1 | 4/2001 | Ellenbogen |
| 6,249,567 B1 | 6/2001 | Rothschild et al. |
| 6,252,929 B1 | 6/2001 | Swift et al. |
| 6,256,369 B1 | 7/2001 | Lai |
| 6,278,115 B1 | 8/2001 | Annis et al. |
| 6,282,260 B1 | 8/2001 | Grodzins |
| 6,292,533 B1 | 9/2001 | Swift et al. |
| 6,301,326 B2 | 10/2001 | Bjorkholm |
| 6,320,933 B1 | 11/2001 | Grodzins et al. |
| 6,347,132 B1 | 2/2002 | Annis |
| 6,356,620 B1 | 3/2002 | Rothschild et al. |
| 6,424,695 B1 | 7/2002 | Grodzins et al. |
| 6,434,219 B1 | 8/2002 | Rothschild et al. |
| 6,435,715 B1 | 8/2002 | Betz et al. |
| 6,442,233 B1 | 8/2002 | Grodzins et al. |
| 6,445,765 B1 | 9/2002 | Frank et al. |
| 6,453,003 B1 | 9/2002 | Springer et al. |
| 6,453,007 B2 | 9/2002 | Adams et al. |
| 6,456,684 B1 | 9/2002 | Mun et al. |
| 6,459,761 B1 | 10/2002 | Grodzins et al. |
| 6,459,764 B1 | 10/2002 | Chalmers et al. |
| 6,473,487 B1 | 10/2002 | Le |
| RE37,899 E | 11/2002 | Grodzins et al. |
| 6,483,894 B2 | 11/2002 | Hartick et al. |
| 6,507,025 B1 | 1/2003 | Verbinski et al. |
| 6,532,276 B1 | 3/2003 | Hartick et al. |
| 6,542,574 B2 | 4/2003 | Grodzins |
| 6,542,578 B2 | 4/2003 | Ries et al. |
| 6,542,580 B1 | 4/2003 | Carver et al. |
| 6,546,072 B1 | 4/2003 | Chalmers |
| 6,552,346 B2 | 4/2003 | Verbinski et al. |
| 6,563,903 B2 | 5/2003 | Kang et al. |
| 6,580,778 B2 | 6/2003 | Meder |
| 6,584,170 B2 | 6/2003 | Aust et al. |
| 6,597,760 B2 | 7/2003 | Beneke et al. |
| 6,606,516 B2 | 8/2003 | Levine |
| 6,636,581 B2 | 10/2003 | Sorenson |
| 6,653,588 B1 | 11/2003 | Gillard-Hickman |
| 6,658,087 B2 | 12/2003 | Chalmers et al. |
| 6,663,280 B2 | 12/2003 | Doenges |
| 6,665,373 B1 | 12/2003 | Kotowski et al. |
| 6,665,433 B2 | 12/2003 | Roder |
| 6,763,635 B1 | 7/2004 | Lowman |
| 6,785,357 B2 | 8/2004 | Bernardi et al. |
| 6,812,426 B1 | 11/2004 | Kotowski et al. |
| 6,816,571 B2 | 11/2004 | Bijjani et al. |
| 6,837,422 B1 | 1/2005 | Meder |
| 6,839,134 B2 | 1/2005 | Saito et al. |
| 6,839,403 B1 | 1/2005 | Kotowski et al. |
| 6,843,599 B2 | 1/2005 | Le et al. |
| 6,920,197 B2 | 7/2005 | Kang et al. |
| 6,928,141 B2 | 8/2005 | Carver et al. |
| 7,039,159 B2 | 5/2006 | Muenchau et al. |
| 7,099,434 B2 | 8/2006 | Adams et al. |
| 7,103,137 B2 | 9/2006 | Seppi et al. |
| 7,116,235 B2 | 10/2006 | Alioto et al. |
| 7,166,844 B1 | 1/2007 | Gormley et al. |
| 7,207,713 B2 | 4/2007 | Lowman |
| 7,238,951 B2 | 7/2007 | Disdier et al. |
| 7,244,947 B2 | 7/2007 | Polichar et al. |
| 7,260,255 B2 | 8/2007 | Polichar et al. |
| 7,322,745 B2 | 1/2008 | Agrawal et al. |
| 7,352,843 B2 | 4/2008 | Hu et al. |
| 7,372,040 B2 | 5/2008 | Polichar et al. |
| 7,420,174 B2 | 9/2008 | Kurita |
| 7,453,987 B1 | 11/2008 | Richardson |
| 7,483,511 B2 | 1/2009 | Bendahan et al. |
| 7,505,556 B2 | 3/2009 | Chalmers et al. |
| 7,505,557 B2 | 3/2009 | Modica et al. |
| 7,525,101 B2 | 4/2009 | Grodzins |
| 7,547,888 B2 | 6/2009 | Cooke et al. |
| 7,649,976 B2 | 1/2010 | Georgeson et al. |
| 7,724,869 B2 | 5/2010 | Wang et al. |
| 7,738,687 B2 | 6/2010 | Tortora |
| 7,741,612 B2 | 6/2010 | Clothier et al. |
| 7,760,103 B2 | 7/2010 | Frank |
| 7,783,003 B2 | 8/2010 | Clayton |
| 7,800,073 B2 | 9/2010 | Clothier et al. |
| 7,809,104 B2 | 10/2010 | Foland |
| 7,876,879 B2 | 1/2011 | Morton |

(56) References Cited

U.S. PATENT DOCUMENTS

| | | |
|---|---|---|
| 7,952,079 B2 | 5/2011 | Neustadter et al. |
| 8,031,903 B2 | 10/2011 | Paresi et al. |
| 8,173,970 B2 | 5/2012 | Inbar |
| 8,263,938 B2 | 9/2012 | Bjorkholm |
| 8,389,941 B2 | 3/2013 | Bendahan et al. |
| 8,389,942 B2 | 3/2013 | Morton |
| 2005/0023479 A1 | 2/2005 | Grodzins |
| 2005/0117700 A1 | 6/2005 | Peschmann |
| 2005/0156734 A1 | 7/2005 | Zerwekh et al. |
| 2007/0085010 A1 | 4/2007 | Letant et al. |

FOREIGN PATENT DOCUMENTS

| | | |
|---|---|---|
| EP | 287707 | 10/1988 |
| EP | 919186 | 6/1999 |
| EP | 1413898 | 4/2004 |
| GB | 2255634 | 11/1992 |
| GB | 2424065 | 9/2006 |
| GB | 2438317 | 11/2007 |
| WO | WO9855851 | 12/1998 |
| WO | WO9855851 A1 | 12/1998 |
| WO | WO2004010127 | 1/2004 |
| WO | WO2005098400 | 10/2005 |
| WO | WO2006036076 | 4/2006 |
| WO | WO2006045019 | 4/2006 |
| WO | WO2006078691 | 7/2006 |
| WO | WO2006095188 | 9/2006 |
| WO | WO2007035359 | 3/2007 |
| WO | WO2007051092 | 5/2007 |
| WO | WO2007068933 | 6/2007 |
| WO | WO2008017983 | 2/2008 |
| WO | WO2009150416 | 12/2009 |
| WO | WO2011087861 | 7/2011 |

OTHER PUBLICATIONS

International Search Report PCT/GB2009/000515, Feb. 23, 2010, Rapiscan Security Products, Inc.
International Search Report PCT/GB2009/001250, May 20, 2009, Rapiscan Security Products.
International Search Report PCT/GB2009/001275, Nov. 26, 2009, Rapiscan Security Products, Inc.
International Search Report PCT/GB2009/001277, May 20, 2008, Rapiscan Systems, Inc.
International Search Report PCT/GB2009/001444, Dec. 17, 2009, Rapiscan Security Products.
Molchanov et al., "Nanosecond Gated Optical Sensors for Ocean Optic Applications," Sensors Applications Symposium, 2006, Proceedings of the 2006 IEEE, Feb. 7, 2006, 147-150.
Search Report for WO2009/106847, Sep. 3, 2009, Rapiscan Security Products.
Search Report PCT/GB2009/000497, Jan. 26, 2010, Rapiscan Security Products, Inc.
Search Report for WO 2011/087861, May 31, 2012, Rapiscan Systems, Inc.

* cited by examiner

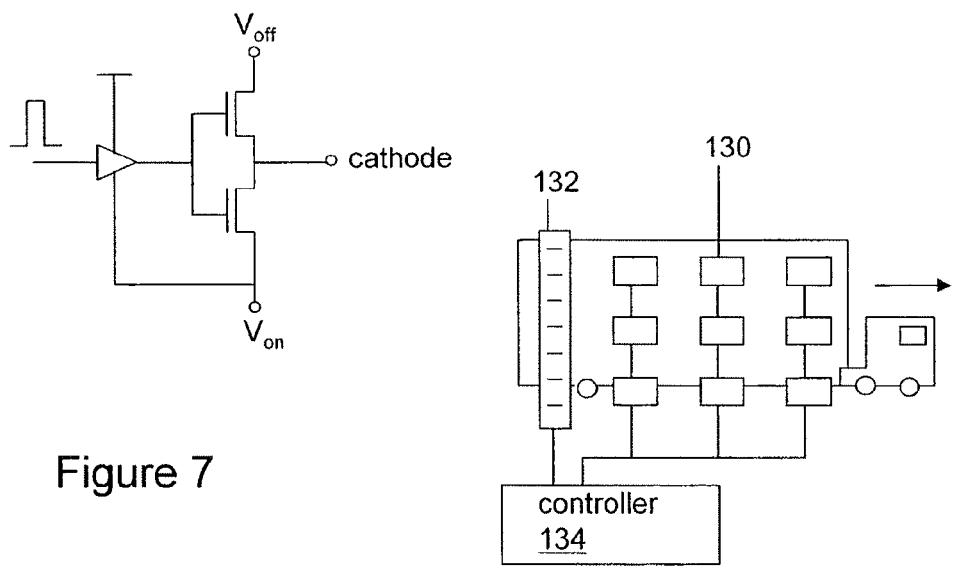
Figure 7
Figure 13
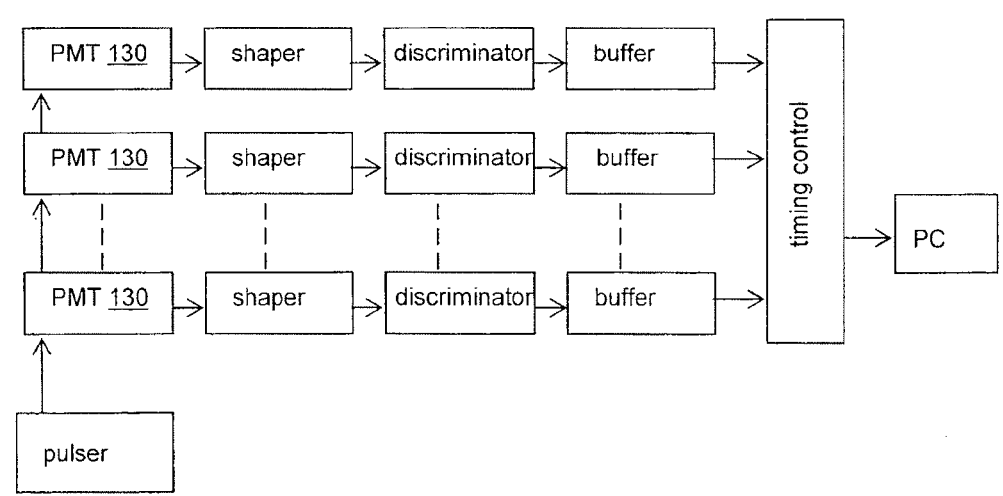
Figure 8

PHOTOMULTIPLIER AND DETECTION SYSTEMS

CROSS-REFERENCE TO RELATED APPLICATIONS

The present application is a continuation of U.S. patent application Ser. No. 12/997,251, which is a national stage application of PCT/GB2009/001444, filed on Jun. 11, 2009, which, in turn, relies on Great Britain Patent Application Number 0810638.7, filed on Jun. 11, 2008, for priority. All priority applications are herein incorporated by reference in their entirety.

FIELD OF THE INVENTION

The present invention relates to a photomultiplier, particularly (but not exclusively) useful in detection systems for detecting radiation-emitting material in an object, e.g. uranium in a box or a lorry.

BACKGROUND OF THE INVENTION

There is a requirement for screening of cargo items for detection of illicit materials and devices. Among these illicit substances are special nuclear materials such as Uranium and Plutonium.

It is known that such materials can be detected using radiation detectors operating in a pulse counting mode where the detector is selected for the measurement of gamma radiation, typically in the energy range 0.05 MeV to 2 MeV.

These devices are typically operated in a portal design 10 in which large slabs of radiation detector material 12 are suspended either side of a measuring area and an item 14 under inspection is driven between the radiation detectors as shown in FIG. 1, in order to attempt to detect any radiation source 16.

SUMMARY OF THE INVENTION

The independent claims define aspects of the invention for which protection is sought. The dependent claims define preferable inventive features. Any of the features of the dependent claims may be used in combination with the features of other claims, even if they are not explicitly dependent upon them—this will be clear to a person skilled in the field.

Where a feature is claimed in one category (e.g. method, system, detector, arrangement, etc.) protection is sought for that feature in other categories even if not explicitly claimed.

BRIEF OF DESCRIPTION OF THE DRAWINGS

Embodiments of the present invention will now be described by way of example only, with reference to the accompanying drawings in which.

Figure 3:
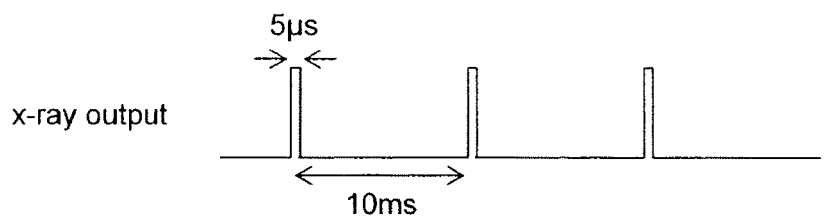
Figure 4:
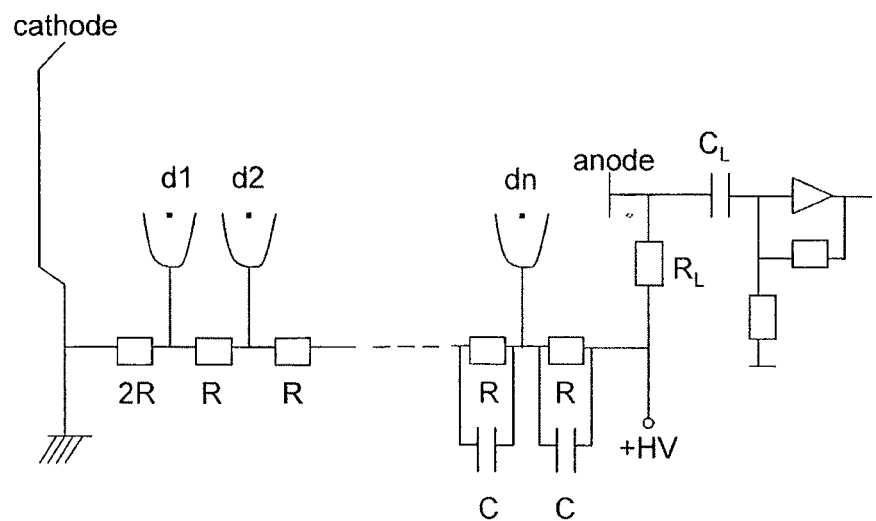
Figure 5:
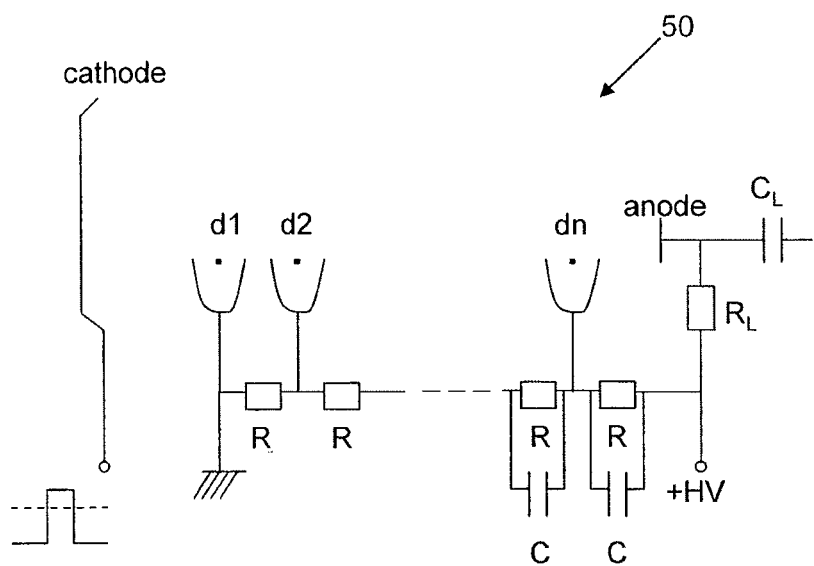
Figure 6:
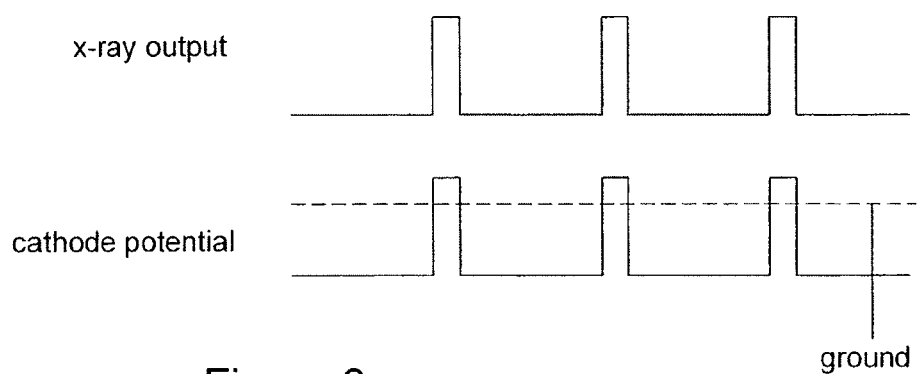
Figure 9:
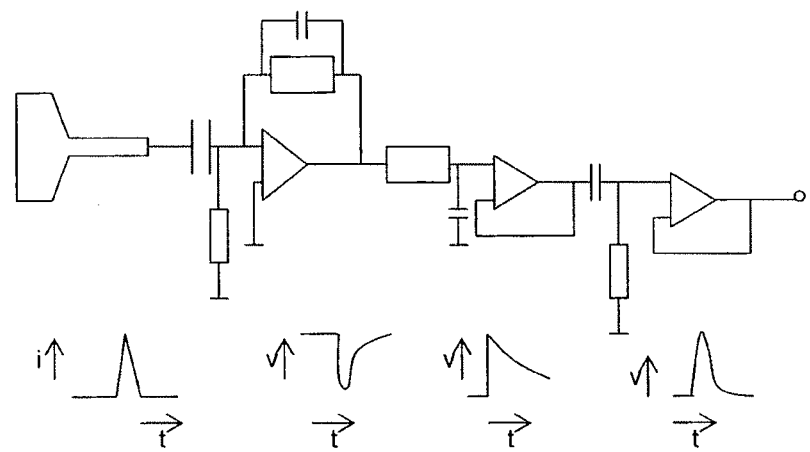
Figure 10:
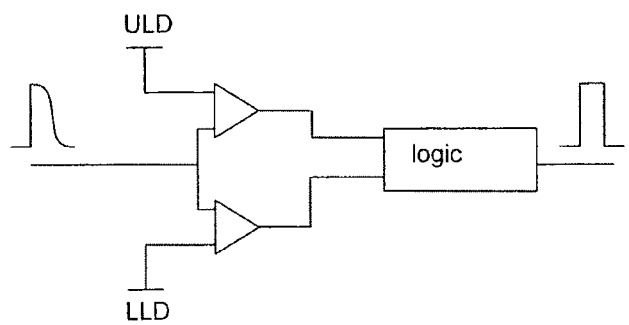
Figure 11:
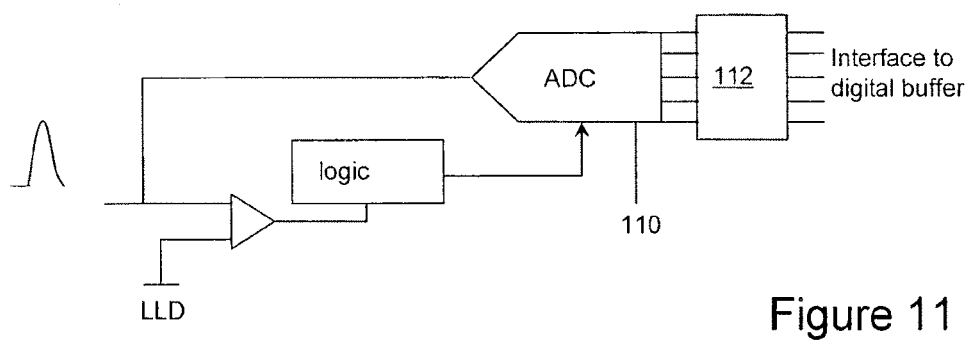
Figure 12:
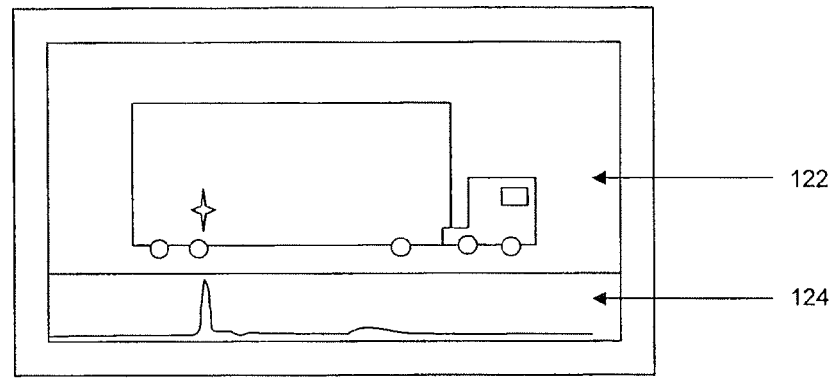

FIG. 3 diagrammatically represents a series of X-ray pulses used with the present invention;

FIG. 4 shows a conventional photomultiplier tube circuit;

FIG. 5 shows a photomultiplier tube circuit according to an embodiment of this invention;

FIG. 6 shows a timing diagram of X-ray output against cathode potential provided by the circuit of FIG. 5;

FIG. 7 shows a circuit suitable for driving the cathode switching potential in the circuit of FIG. 5;

FIG. 8 shows a data acquisition system for use with an embodiment of this invention;

FIG. 9 shows a shaper circuit for shaping the data signal received from a photomultiplier tube according to an embodiment of this invention;

FIGS. 10 and 11 show alternative discriminators for use with embodiments of this invention;

FIG. 12 shows an example of a user viewable output from the system of an embodiment of this invention;

FIG. 13 shows a data acquisition system of an embodiment of this invention; and

Figure 14:
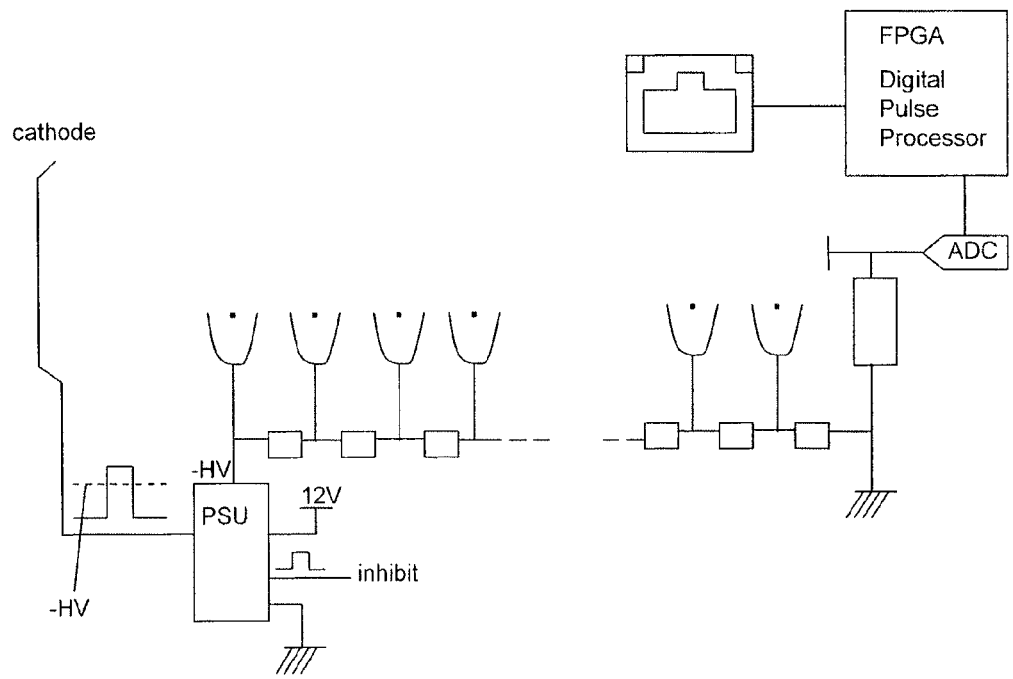

FIG. 14 shows an alternative photomultiplier tube circuit according to an embodiment of this invention.

DETAILED DESCRIPTION OF THE INVENTION

In the present invention, it is recognised that the use of high energy X-ray inspection devices is becoming increasingly common for cargo screening, and that the X-rays produced by these devices interfere with the standard passive radiation detection systems so reducing the sensitivity of the passive radiation detection system to hidden special nuclear materials and other gamma-ray emitting sources.

The independent claims define aspects of the invention for which protection is sought. The dependent claims define preferable inventive features. Any of the features of the dependent claims may be used in combination with the features of other claims, even if they are not explicitly dependent upon them—this will be clear to a person skilled in this field.

Figure 2:
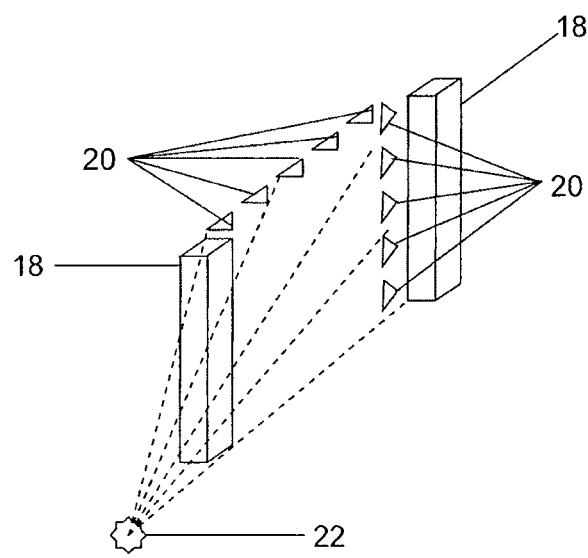
FIG. 2 shows a set of radiation detectors (X-ray and passive radiation) according to an embodiment of this invention.

In the first aspect of this invention, a set of radiation detectors 18 for passive radiation monitoring are co-located with a set of imaging detectors 20 for high-energy X-ray inspection. An example embodiment is shown in FIG. 2. The X-ray source 22 will typically be an X-ray linear accelerator in which the output beam comprises a series of intense pulses of X-rays as described in FIG. 3. The period between pulses is typically 10 ms with a pulse width of typically 5 µs. Therefore, for approximately 99.95% of the time, the X-ray beam is not emitting. Other pulse arrangements will be apparent to the skilled person.

In the time between X-ray pulses, the passive radiation detectors 18 are able to accumulate the gamma-ray signal as planned. However, every 10 ms or so, the operation of the gamma-ray detectors will be significantly perturbed the presence of the X-ray beam, and this will destroy the validity of the gamma-ray signals that were collected in the previous time period.

In order to address this issue, in the present invention a circuit is described that effectively renders the gamma-ray detectors 18 inactive during the X-ray pulse period, but enables the detectors 18 at all other times.

Typically, a gamma ray detector that is designed for monitoring of low activity gamma ray sources will be as large as possible in order to subtend the largest possible solid angle back to the source. Therefore, it is uncommon to use a semiconductor detector for this purpose. Further, the gamma radiation is often at high energy and so the use of a large volume gas ionisation based detection system is generally considered to be impractical. Generally, such detectors use a scintillation detector that may be a high density in-organic material such as CsI, NaI or BGO or a low density in-organic plastic scintillator. In the case of a passive radiation monitor, it is conventional to employ a large plastic scintillator since this is generally a less expensive solution than using an in-organic detector material.

In either case, the scintillator converts the gamma-ray energy to an optical light pulse which is transported through the bulk of the scintillator material to one or more optical detectors. These detectors could be made from a semiconductor material such as silicon. However, the area that would need to be covered by detector material makes such an approach expensive, and the large area drives up capacitance which in turn makes forming a low noise readout circuit extremely difficult. A more practical solution is to utilise one or more photomultiplier tubes. A photomultiplier tube comprises a vacuum envelope within which is a photocathode, a number of dynodes and an anode. Light passes into the photocathode from the scintillator and results in the generation of low energy photoelectrons. These photoelectrons are drifted in an electric field towards a first dynode. As they pass through the field, the photoelectrons pick up energy such that when they strike the first dynode, each photoelectron is capable of generating multiple secondary electrons (typically 3 to 5). These secondary electrons accelerate in an electric field towards a second dynode where further secondary electrons are generated. Finally a large cloud of electrons reach an anode where a large current pulse is generated per incident optical photon. A typical gain is $10^6$ electrons per photon.

A photomultiplier tube is typically wired up using a resistor chain substantially as shown in FIG. 4. Often, a photomultiplier tube will have 10 dynodes and will be operated with a positive high voltage of around 1000V. Using Ohms law, it can be seen that the voltage between dynodes is then around 83V. To improve system linearity and uniformity of signal collection from the photocathode of the photomultiplier tube, the accelerating voltage between the cathode and first dynode is often increased to around 165V.

At high dynode numbers, it is often advantageous to place capacitors in parallel with the resistor chain in order to support the high current pulses in this region of the dynode chain to ensure stable operating voltage which in turn ensures good linearity of the detection system. This is shown with dynode d0 in FIG. 4.

When subjected to a large signal pulse due to exposure to radiation from an X-ray linear accelerator, voltage drops start to occur across the dynode chain due to the exceptionally high current flows that result from such a bright signal and this causes the voltage across the photomultiplier tube to collapse. This sends a large current pulse through the coupling capacitor, $C_L$, into the preamplifier which in turn saturates the subsequent readout electronics. It can take tens of milliseconds for the detection system to return back to a usable operating state. In the context of a combined X-ray and gamma-ray detection system, this is an unacceptable operating condition.

In the present invention, an alternative circuit topology 50 is described and is shown in FIG. 5. Here, the first dynode, d1, is connected to ground and a standard resistor ladder is used from this point forwards. The cathode is now connected to a switching potential which may be set to a negative value with respect to ground potential or to a small positive potential with respect to ground potential. Since there is a physically large separation between the cathode and first dynode and the dielectric constant of vacuum is essentially zero, the capacitive coupling between the cathode and dynode is negligible. This means that the potential that is applied to the cathode can be varied with very high slew rate with no significant measureable effect at the first dynode or consequently at any further point in the signal chain. This provides a very clean way to disable the electronics during the high intensity burst of X-ray signal from the X-ray linear accelerator source.

Referring to FIGS. 5 and 6, it is seen that if the cathode potential normally rests at a negative potential (typically −165V) with respect to ground then the photomultiplier tube operates normally and behaves as a passive radiation monitor.

During an X-ray output phase, the cathode potential is switched to ground potential or to a small potential that is positive with respect to ground (as shown graphically in FIG. 6) and the operation of the photomultiplier tube is totally inhibited. As soon as the X-ray pulse has passed, the cathode potential can be switched back to a negative level and the passive radiation monitor will continue to operate. Of course, the +HV value should be decreased by the cathode normal operating potential in order to achieve the required signal gain in the dynode chain (i.e. +HV should be reduced from 1000V to 835V using the figures from the above examples).

By establishing a small positive potential between the cathode and the first dynode (for example 10V), any energetic photoelectrons that are produced during the X-ray burst will be actively returned to the cathode during the burst itself so that the vacuum gap between the cathode and first dynode is free of any drifting electrons which could otherwise contaminate the signals to be recorded immediately after the cathode potential is returned to its active value.

A suitable circuit for driving the cathode switching potential is shown in FIG. 7. This "push-pull" circuit can achieve switching times from −Von (for example −165V) to +Voff (for example +10V) potential in times of the order of 100 ns. It is convenient to opto-couple the switching signal into the buffer in order to level shift the signal from typical digital control circuitry referenced to ground potential to this circuit which is referenced to −Von potential.

Figure 1:
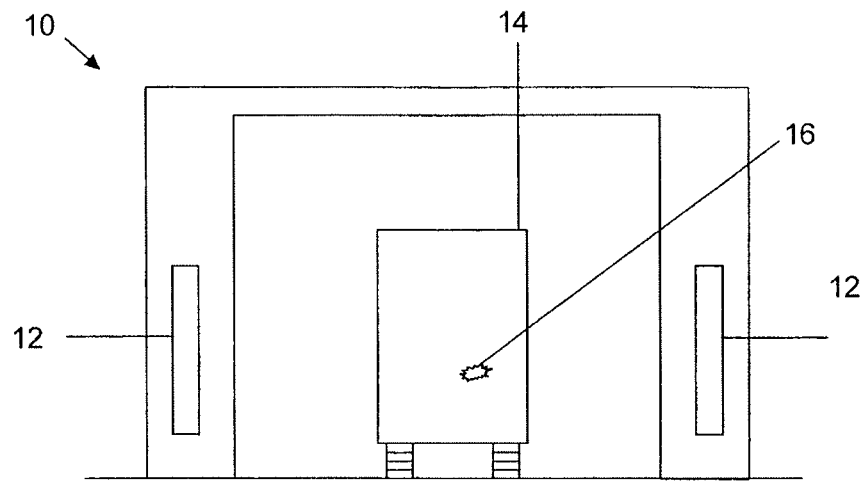
FIG. 1 shows a typical portal design of radiation detector.

An example data acquisition system for use with the passive radiation detector is shown in FIGS. 8 and 13. In this example, the passive detection system comprises an array of detectors—each passive detector comprises a photomultiplier tube 130. Each tube 130 is arranged in a known spatial position. An active scanning system arranged to scan an object (in this example a vehicle) comprises a further linear detector array 132 for detecting radiation emitted by a radiation source of the scanning system. The radiation from the active radiation source irradiates the object and the active system's linear detector 132 detects radiation that passes through or is scattered by the object. The position of the scanning system detector 132 relative to each detector 130 is known. As the vehicle moves past the detectors 130, 132, information from the detectors 130, 132 is sent to a controller 134. The speed of the vehicle can also be taken into account when producing the spatially correlated information. The controller correlates spatially the information from the two sets of detectors 130, 132. This is possible for the passive detector since it is in the form of an array of separate detectors 130—each detector measures absolute levels of radiation, in order to detect radiation emitted from any radiation-emitting material in the object—this detection is controlled by the controller 134 such that it is carried out whilst the active radiation source is not irradiating the object. In the prior art, passive detectors are not provided in such arrays, instead there is only a large passive detector (as described with reference to FIG. 1) and spatially correlated information is not provided in the same way. The spatially correlated information can be used to determine where within an actively scanned region a passively detected radiation-emitting material is located. Here, each photomultiplier tube (PMT) 130 is coupled to its own shaper circuit, discriminator and digital data buffer. Therefore the overlaid image shown in FIG. 12 can be obtained in some embodiments (as described in further detail below).

As shown in FIG. 9, the shaper circuit formats the data from the PMT into a pulse suitable for subsequent discrimination. The first stage in the shaper is a gain stage with a time constant set that is typically several milliseconds. The second stage is RC (low pass) filtering followed by CR (high pass) filtering to leave a positive going pulse with duration of typically a few microseconds. The selection of filtering times in the RC-CR shaping stage will define the noise performance of the system but is typically set for both parts at a few microseconds. Other settings will be apparent to the skilled person.

The discriminator circuit may have different design depending on specific application. When using plastic scintillators in which there is no true photopeak (due to the low atomic number of the scintillator material) it is typically sufficient to introduce a single discriminator window using a circuit of the type shown in simplified form in FIG. 10. Here, the output from the shaper stage passes into two analogue comparator circuits, The first checks the height of the pulse with respect to a lower level discriminator (LLD) setting and the other checks the height of the pulse with respect to an upper level discriminator (ULD) setting. Pulses which are greater in magnitude than the LLD but lower than the ULD are accepted and generate a digital output pulse at the output of the logic circuit.

In an alternative embodiment which is better suited for use with in-organic scintillators where the magnitude of the optical signals generated better reflects the shape of the input gamma-ray energy distribution, the intensity of the light flash is measured using an analogue-to-digital converter 110 and the values of successive values can be histogrammed to form an energy dependent analysis of the material under inspection. Such a circuit is shown in simplified form in FIG. 11. Here the logic circuit is used to determine whether the signal is above the noise floor. If it is, an ADC conversion is initiated and the resulting digital value is then histogrammed to a digital memory 112.

At the final stage of data acquisition, the digital data from each photomultiplier detection chain is multiplexed down to a single data stream which is advantageously in the Ethernet format. This data is passed to a computer for final analysis.

In the event that a discriminator of the form shown in FIG. 10 is used, the analysis will normally consist of a dynamic background subtraction followed by comparison of the residual signal against threshold. If an above threshold signal is observed, an alarm will typically be raised.

In the event that a discriminator of the form shown in FIG. 11 is used, the analysis will normally proceed as noted above. However, if an above threshold signal is detected, the shape of the energy distribution will typically be analysed against known spectral lines in order to provide a preliminary assessment of the type of radioactive material that has been detected, and both the type and activity of the radioactive source will be passed on to the operator.

In a further aspect of this invention, data 122 from the passive radiation monitoring system is overlayed with image data 124 from the X-ray imaging system. An example data overlay is shown in FIG. 12. Here, the total count per X-ray pulse is displayed in graphical form in a window at the base of the screen. To improve noise performance, the operator is provided with means to change the integration window for the gamma-ray data so that the signal distribution appears "smoother". In the event that gamma-ray spectral data has been collected, the operator is provided with a pop-up window to view both the energy distribution and fitting data to a suitable gamma-ray library. This graphical view should normally utilise the same integration window that is used for display of the primary count data. As the operator moves their cursor about the image, the graph is advantageously updated in real-time to reflect the gamma-ray spectrum that was collected from the equivalent region of the object under inspection.

It is advantageous to combine spectral data collection with the use of data deconvolution algorithm. Such an algorithm is provided with the energy response function of the detector itself so that this response can be de-convolved from the measured gamma-ray spectral data. Further, the energy response function for a number of known gamma-ray sources is provided to the de-convolution algorithm such that signals that fall into the Compton continuum can be restored to their full energy peak. This provides a considerably sharper spectrum which can be used to good advantage when fitting to data from a standard gamma-decay library.

In another aspect of the invention, FIG. 14 shows an alternative system set-up to that shown in FIG. 5. Typically X-rays having a peak energy value of 900 keV or higher are used for X-ray scanning in this invention. There are three primary parts to this front-end electronics configuration circuit:
1. Power supply unit, PSU. This takes +12V input and converts this to an adjustable voltage of up to −1 kV for driving the photomultiplier tube. The PSU also generates a cathode potential which may be switched to a negative or positive potential with respect to the −HV output in order to inhibit the photomultiplier tube, PMT operation during X-ray pulses.
2. Analogue to digital converter, ADC. This directly digitises the output of the PMT. This should be a high speed device that is capable of recording pulse heights during the X-ray pulse as well as pulses due to passive gamma interactions.
3. Field-programmable gate array, FPGA. The FPGA is configured as a digital pulse processor. This provides time and magnitude information for every above-threshold radiation interaction. The FPGA drives the event based data stream out to the rest of the data acquisition system.

The detectors are not temperature stabilised in this embodiment since it is expensive to undertake this and also leads to unreliability of systems in practical customer installations. The present system should therefore be capable of calibration by a relatively untrained operator.

One way to do this is to provide a reference radioactive source for every detector and to use this for spectrum stabilisation. However, this may be difficult to achieve and leads to transportation issues.

As an alternative, a light source with line of sight to the scintillator can be pulsed and this used as a way of confirming the calibration of the PMT and electronics system. This is simple to achieve and by splitting the light source so that it irradiates a photodiode as well as the scintillator, it is possible to provide a reasonably accurate calibration of the system.

I claim:
1. A photomultiplier, wherein said photomultiplier is adapted to be switchable between a detecting state and a non-detecting state, comprising:
   a cathode, wherein said cathode is arranged to receive incident radiation;
   a plurality of electrodes; and
   a first electrode of the plurality of electrodes, wherein said first electrode is operatively closest to the cathode relative to other of said plurality of electrodes, wherein said first electrode is at a first potential and wherein an electrical potential of the cathode is switchable between a second potential, below the first potential, when the photomultiplier is in the detecting state and a third potential, above the second potential, when the photomultiplier is in the non-detecting state.
2. The photomultiplier of claim 1 wherein the plurality of electrodes are arranged to amplify a current created at the cathode due to the detection of said radiation.

3. The photomultiplier of claim 1 wherein the first electrode is electrically grounded.

4. The photomultiplier of claim 1 wherein the third potential is ground.

5. The photomultiplier of claim 1 wherein the third potential is above ground.

6. The photomultiplier of claim 1 wherein the first potential is about 0V, the second potential is about −165V, and the third potential is about +10V.

7. The photomultiplier of claim 1 wherein the first electrode and cathode are positioned relative to each other such that the capacitive coupling between them is negligible.

8. The photomultiplier of claim 1 wherein a vacuum is positioned between the first electrode and the cathode.

9. The photomultiplier of claim 1 wherein the first electrode is held at a low voltage below ground.

10. The photomultiplier of claim 1 wherein the third potential is held at a low voltage below ground.

11. The photomultiplier of claim 1 comprising an anode which is electrically substantially at ground potential.

12. A detection system arranged to detect radiation-emitting material in an object, the system comprising:
   a) A detector comprising a switchable photomultiplier, wherein said detector is switchable between a detecting state in which the detector is arranged to detect radiation and a non-detecting state in which the detector is arranged to not detect radiation; and
   b) A controller arranged to control said switching of the detector between the detecting and non-detecting states such that the detector is switched to the non-detecting state while an external radiation source is irradiating the object.

13. The detection system of claim 12 wherein the external radiation source is part of a scanning system arranged to scan the object by irradiating the object via the external radiation source and subsequently detecting radiation that passes through the object and/or is scattered by the object.

14. The detection system of claim 12 wherein the detector comprises said switchable photomultiplier coupled with a scintillator.

15. The detection system of claim 12 wherein the external radiation source is arranged to irradiate the object in bursts and the controller is arranged to switch the detector to the non-detecting state during the bursts.

16. The detection system of claim 12 wherein following a burst from the external radiation source, the detector is configured to recover to a condition in which it is able to effectively detect radiation from a radiation-emitting material after a period of time and the controller is arranged to switch the detector to the non-detecting state during the bursts and also during the period of time.

17. The detection system of claim 16 wherein the period of time is less than 10 ms.

18. The detection system of claim 12 wherein the controller is arranged to switch the detector from the detecting state to the non-detecting state in 10 ns to 1000 ns.

19. The detection system of claim 12 wherein the controller comprises a push-pull circuit.

* * * * *